(12) United States Patent
Shinnaka

(10) Patent No.: US 9,048,778 B2
(45) Date of Patent: Jun. 2, 2015

(54) ROTOR PHASE/SPEED ESTIMATING DEVICE FOR AN AC MOTOR

(75) Inventor: Shinji Shinnaka, Yokohama (JP)

(73) Assignee: Nidec Corporation, Kyoto (JP)

( * ) Notice: Subject to any disclaimer, the term of this patent is extended or adjusted under 35 U.S.C. 154(b) by 199 days.

(21) Appl. No.: 13/641,361

(22) PCT Filed: Apr. 15, 2011

(86) PCT No.: PCT/JP2011/059337
§ 371 (c)(1),
(2), (4) Date: Oct. 15, 2012

(87) PCT Pub. No.: WO2011/129423
PCT Pub. Date: Oct. 20, 2011

(65) Prior Publication Data
US 2013/0033254 A1 Feb. 7, 2013

(30) Foreign Application Priority Data

Apr. 17, 2010 (JP) .................................. 2010-108718

(51) Int. Cl.
*G01P 3/42* (2006.01)
*H02P 21/14* (2006.01)
*H02P 21/00* (2006.01)

(52) U.S. Cl.
CPC .......... *H02P 21/146* (2013.01); *H02P 21/0042* (2013.01); *H02P 2203/11* (2013.01)

(58) Field of Classification Search
CPC .............. H02P 21/0042; H02P 21/146; H02P 2203/11; H02P 2207/01; H02P 2207/05; G01B 7/30; G01B 7/003

USPC .............. 324/160, 164, 179, 207.11, 207.13, 324/207.22, 207.23, 207.24, 207.25
See application file for complete search history.

(56) References Cited

U.S. PATENT DOCUMENTS 6,922,028 B2 * 7/2005 Akizuki .................. 318/400.04
7,885,785 B1 * 2/2011 Pekarek et al. ............... 702/151
(Continued)

FOREIGN PATENT DOCUMENTS

JP 2000-125589 A 4/2000
JP 2003-153582 A 5/2003
(Continued)

OTHER PUBLICATIONS

Official Communication issued in International Patent Application No. PCT/JP2011/059337, mailed on Jun. 28, 2011.
(Continued)

*Primary Examiner* — Huy Q Phan
*Assistant Examiner* — David Frederiksen
(74) *Attorney, Agent, or Firm* — Keating & Bennett, LLP

(57) ABSTRACT

A rotor phase/speed estimating device includes a high-frequency voltage injection unit, a high-frequency current amplitude detection unit of a fundamental wave component, a correlation signal generation unit, and a rotor phase generation unit. The high-frequency voltage injection unit applies a high-frequency voltage to an AC motor. The high-frequency current amplitude detection unit of a fundamental wave component detects a primary Fourier coefficient equivalent value. The correlation signal generation unit is arranged to generate a correlation signal using the Fourier coefficient equivalent value. The rotor phase generation unit is arranged to generate an estimated value of the rotor phase and an estimated value of a rotor speed using the correlation signal.

6 Claims, 9 Drawing Sheets

(56) References Cited

U.S. PATENT DOCUMENTS

| | | | |
|---|---|---|---|
| 2002/0113569 A1* | 8/2002 | Iijima et al. | 318/727 |
| 2003/0006723 A1* | 1/2003 | Sul et al. | 318/127 |
| 2003/0030406 A1* | 2/2003 | Takahashi et al. | 318/714 |
| 2004/0070360 A1* | 4/2004 | E. Schulz et al. | 318/700 |
| 2004/0070362 A1* | 4/2004 | Patel et al. | 318/701 |
| 2005/0052177 A1* | 3/2005 | Piippo | 324/174 |
| 2010/0066284 A1* | 3/2010 | Iwaji et al. | 318/400.02 |
| 2010/0194329 A1* | 8/2010 | Lu et al. | 318/798 |
| 2011/0241658 A1* | 10/2011 | Vollmer | 324/207.25 |

FOREIGN PATENT DOCUMENTS

| | | |
|---|---|---|
| JP | 2007-185080 A | 7/2007 |
| JP | 4178834 B2 | 11/2008 |
| JP | 2008-301695 A | 12/2008 |
| JP | 2009-171680 A | 7/2009 |
| JP | 2009-273254 A | 11/2009 |
| JP | 2009-273283 A | 11/2009 |

OTHER PUBLICATIONS

Chen et al.: "Research of Position Sensorless Control of PMSM Based on High Frequency Signal Injection", Proc. of International Conference of Electrical Machines and Systems (ICEMS 2008), Oct. 2008, pp. 3973-3977.

Shinnaka: "Vector Control Technology of Permanent-Magnet Synchronous Motor (vol. II, The Essence of Sensor-less Drive)", Sangyo-Tosho, Dec. 2008, Table of Contents.

* cited by examiner

ROTOR PHASE/SPEED ESTIMATING DEVICE FOR AN AC MOTOR

BACKGROUND OF THE INVENTION

1. Field of the Invention

The present invention relates to a rotor phase/speed estimating device that estimates a phase (i.e., a position) and a speed of a rotor without having to use a position/speed sensor (i.e., in a sensor-less manner). The rotor phase/speed estimating device is preferably used in a drive control device in an AC motor in which a rotor shows a salient pole characteristic with respect to a high-frequency current having a frequency higher than a drive frequency (e.g., a permanent-magnet synchronous motor including a permanent magnet arranged in a rotor, a wound-rotor type synchronous motor, a synchronous reluctance motor, a hybrid field-magnet type synchronous motor including a permanent magnet and a field winding arranged in a rotor, an induction motor, etc.).

2. Description of the Related Art

High-performance control of an AC motor can be achieved by a so-called vector control method. Information on a phase of a rotor or a speed thereof as a derivative of the phase is needed in the vector control method. In the past, use has been made of a position/speed sensor such as an encoder or the like. However, the use of this kind of position/speed sensor is not desirable from the view point of reliability, axial volume, sensor cable arrangement, and cost. Research and development have long been conducted regarding a so-called sensor-less vector control method requiring no position/speed sensor.

As a dominant sensor-less vector control method, there has heretofore been developed and reported a variety of high-frequency voltage injection methods that estimate a rotor phase or the like by forcibly injecting a high-frequency voltage having a frequency higher than a drive frequency to a motor and then detecting and processing a high-frequency current as a response thereto.

A rotor phase to be estimated may be set as an arbitrary position of a rotor. If the rotor shows a salient pole characteristic, it is typical that one of a negative salient pole phase and a positive salient pole phase of the rotor is selected as the rotor phase. As is well-known to those skilled in the art, an electric phase difference between the negative salient pole phase and the positive salient pole phase is nothing more than $\pm \Pi/2$ (rad). If one of the negative salient pole phase and the positive salient pole phase is identified, the other becomes automatically known. In view of the above, the negative salient pole phase of the motor will be used as a rotor phase in the following description unless explicitly mentioned otherwise.

A high-frequency voltage injection method in a broad sense is composed of the combination of a high-frequency voltage injection method in a narrow sense for determining a generation method of a high-frequency voltage to be injected and a phase estimating method for processing a high-frequency current as a response to the high-frequency voltage injected and determining generation of a rotor phase estimate value. As the high-frequency voltage is injected in the high-frequency voltage injection method in a narrow sense, an alternating high-frequency voltage having a zero direct current component and a fixed high frequency is often used. A sinusoidal form and a rectangular form are known as the representative signal forms of the alternating high-frequency voltage.

As the high-frequency voltage injection method in a narrow sense for applying a sinusoidal high-frequency voltage, there are known a generalized elliptical high-frequency voltage injection method, a fixed circular high-frequency voltage injection method (e.g., a fixed-amplitude circular high-frequency voltage injection method), a constant-amplitude non-rotational high frequency voltage injection approach, and so forth. In the event that a sinusoidal high-frequency voltage having a high frequency $\omega_h$ is injected on a $\gamma$-$\delta$ semi-synchronous coordinate system having a coordinate speed $\omega_\gamma$ (a coordinate system composed of a $\gamma$ axis aiming at getting synchronized with a rotor phase with a fixed phase difference represented by a zero phase difference and a $\delta$ axis orthogonal to the $\gamma$ axis), the sinusoidal high-frequency voltage injected by the generalized elliptical high-frequency voltage injection method is expressed by the following equation. In the subject application, signals relating to a high-frequency voltage and a high-frequency current will be clearly specified by attaching a subscript h thereto.

Formula 1

$$v_{1h} = V_h \begin{bmatrix} \left(1 + K\frac{\omega_\gamma}{\omega_h}\right)\cos\omega_h t \\ \left(K + \frac{\omega_\gamma}{\omega_h}\right)\sin\omega_h t \end{bmatrix}; \begin{array}{l} V_h = \text{const} \\ \omega_h = \text{const} \end{array}, 0 \leq K \leq 1; K = \text{const} \quad (1)$$

The sinusoidal high-frequency voltage injected by the fixed circular high-frequency voltage injection method is expressed by the following equation.

Formula 2

$$v_{1h} = V_h \begin{bmatrix} \cos\omega_h t \\ \sin\omega_h t \end{bmatrix}; \begin{array}{l} V_h = \text{const} \\ \omega_h = \text{const} \end{array} \quad (2)$$

The sinusoidal high-frequency voltage injected by the linear high-frequency voltage injection method is expressed by the following equation.

Formula 3

$$v_{1h} = V_h \begin{bmatrix} \cos\omega_h t \\ 0 \end{bmatrix}; \begin{array}{l} V_h = \text{const} \\ \omega_h = \text{const} \end{array} \quad (3)$$

As explicitly specified in an unambiguous manner using equations (1) through (3), the signals of individual vector components in the respective high-frequency voltages have a sinusoidal form expressed by a trigonometric function such as a cosine function or a sine function. In this regard, the variable of the trigonometric function is $\omega_h t$ (i.e., a time integration value of the high frequency $\omega_h$). That is to say, the variable of the trigonometric function is expressed by the following equation.

Formula 4

$$\theta_h = \int_0^t \omega_h d\tau = \omega_h t \quad (4)$$

The sinusoidal high-frequency voltages are not limited to equations (1) through (3) but may be many different values including the combinations of equations (1) through (3). For example, the following high-frequency voltage can be obtained by combining equations (2) and (3).

Formula 5

$$v_{1h} = V_h \begin{bmatrix} (1+K)\cos\omega_h t \\ K\sin\omega_h t \end{bmatrix}; \begin{matrix} V_h = \text{const} \\ \omega_h = \text{const} \end{matrix}, 0 \le K \le 1; K = \text{const} \quad (5)$$

The high-frequency voltage of equation (5) can be obtained by simplifying the high-frequency voltage of equation (1), namely by forcibly making $\omega_\gamma$ equal to zero.

Referring to the expression methods of the sinusoidal high-frequency voltage, the rectangular high-frequency voltage can be expressed using the following signum function sgn(•).

Formula 6

$$v_{1h} = V_h \begin{bmatrix} (1+K)\text{sgn}(\cos\omega_h t) \\ K\text{sgn}(\sin\omega_h t) \end{bmatrix}; \begin{matrix} V_h = \text{const} \\ \omega_h = \text{const} \end{matrix}, 0 \le K \le 1; K = \text{const} \quad (6)$$

In the rectangular high-frequency voltage of equation (6), just like the sinusoidal high-frequency voltage, a DC component does not exist and becomes zero.

In order to apply the high-frequency voltage, a stator voltage target value is composed by superimposing and adding a high-frequency voltage target value to a drive voltage target value. The stator voltage target value thus composed is inputted to a power converter (inverter). Thus, the high-frequency voltage can be injected to a motor. The high-frequency voltage injection method in a narrow sense referred to in the present invention is a method for applying the high-frequency voltages as expressed by equations (1) through (6). The high-frequency voltages have a feature that "the fundamental wave component thereof describes an elliptical locus on a $\gamma$-$\delta$ semi-synchronous coordinate system". In general, an ellipse differs in the ratio of a minor axis to a major axis. In the present invention, a circular locus is treated as an elliptical locus in which the ratio of a minor axis to a major axis is equal to 1. Similarly, a linear locus is treated as an elliptical locus in which the ratio of a minor axis to a major axis is equal to 0.

As the high-frequency voltage is injected to an AC motor, a high-frequency current is generated in response to the high-frequency voltage. In an AC motor showing a salient pole characteristic with respect to a high-frequency current, the high-frequency current is affected by the salient pole characteristic. Thus, the high-frequency current has salient pole phase information, i.e., rotor phase information. Desired rotor phase information can be detected by processing the high-frequency current containing the rotor phase information.

The stator current detected at a stator terminal of an AC motor includes a drive current having a drive frequency and a high-frequency current having a high frequency. In order to detect the rotor phase information from the high-frequency current, it is usually required that only the high-frequency current is separated and detected from the stator current prior to the detecting the rotor phase information. In the past, it was generally understood that filtering, one representative dynamic processing, is used to separate and detect only the high-frequency current from the stator current (see Japanese Patent No. 4178834, Japanese Patent Application Publication No. 2007-185080, Japanese Patent Application Publication No. 2009-171680, Japanese Patent Application Publication No. 2009-273254, Japanese Patent Application Publication No. 2009-273283, and Y. Chen, L. Wang and L. Kong: "Research of Position Sensor-less Control of PMSM Based on High Frequency Signal Injection", Proc. Of International Conference of Electrical Machines and Systems (ICEMS 2008), pp. 3973-3977 (2008-10)).

Considering only the separation and detection of the high-frequency current from the stator current, it is natural to use a filter (a highpass filter or a bandpass filter) in the separation and detection of the high-frequency current. In particular, if the frequency of the high-frequency current to be separated and detected is known and fixed, it is even rational to use the filter. However, if the stable operation of an estimating system is taken into account, it is not necessarily easy to introduce a filter for separation and detection of the high-frequency current into the estimating system. For example, in order to separate and detect a desired high-frequency current from the stator current through the use of a bandpass filter with no variation such as lag and advance of a phase, particularly in order to separate and detect the desired high-frequency current while preventing mixture of other frequency components, it is required to narrow the bandwidth of the bandpass filter. However, the narrow bandwidth tends to make the estimating system unstable. On the contrary, if the stability of the estimating system is considered important, it is necessary to broaden the bandwidth. However, the broad bandwidth tends to simultaneously introduce other components than the high-frequency current having a specified frequency. This makes it difficult to perform estimation with increased accuracy.

As set forth in detail in Y. Chen, L. Wang and L. Kong: "Research of Position Sensor-less Control of PMSM Based on High Frequency Signal Injection", Proc. Of International Conference of Electrical Machines and Systems (ICEMS 2008), pp. 3973-3977 (2008-10), the design of a bandpass filter for separation and detection of a high-frequency current was carried out by a trial-and-error method in the past. Thus, a great deal of time and effort is needed in appropriately designing the bandpass filter (see Y. Chen, L. Wang and L. Kong: "Research of Position Sensor-less Control of PMSM Based on High Frequency Signal Injection", Proc. Of International Conference of Electrical Machines and Systems (ICEMS 2008), pp. 3973-3977 (2008-10)). Moreover, each time when the high frequency of the high-frequency voltage injected is changed, it is necessary to redesign the bandpass filter through another time-consuming trial-and-error method (see Y. Chen, L. Wang and L. Kong: "Research of Position Sensor-less Control of PMSM Based on High Frequency Signal Injection", Proc. Of International Conference of Electrical Machines and Systems (ICEMS 2008), pp. 3973-3977 (2008-10)).

If the highpass filter is used in separating and detecting the high-frequency current, it is usual that the detected high-frequency current undergoes a phase advance due to unavoidable properties of the highpass filter. This phase advance makes it difficult to correctly perform phase estimation. In addition, components beyond the frequency of the high-frequency current are simultaneously mixed into the high-frequency current. This makes it difficult to perform estimation with increased accuracy.

When estimating the phase or speed of a rotor, it is necessary to pay attention even to a positive correlation region between a rotor phase and a correlation signal correlated to the rotor phase. By a narrow positive correlation region, it is meant that the rotor phase is likely to go outside the positive correlation region due to disturbance torque and so forth. Once the rotor phase goes outside the positive correlation region, the stable phase estimation of an estimating system is not guaranteed at all. It is usually impossible to come back to stable estimation once the estimating system fails to perform stable estimation. In the conventional rotor phase estimating methods disclosed in Japanese Patent No. 4178834, Japanese Patent Application Publication No. 2007-185080, Japanese Patent Application Publication No. 2009-171680, Japanese Patent Application Publication No. 2009-273254, Japanese Patent Application Publication No. 2009-273283, and Y. Chen, L. Wang and L. Kong: "Research of Position Sensorless Control of PMSM Based on High Frequency Signal Injection", Proc. Of International Conference of Electrical Machines and Systems (ICEMS 2008), pp. 3973-3977 (2008-10), the positive correlation region between a rotor phase evaluated on a γ-δ semi-synchronous coordinate system and a correlation signal correlated to the rotor phase is as narrow as ±Π/4(rad) at most with respect to $\theta_\gamma$ (see FIGS. 1 through 3B described later).

When estimating the phase or speed of a rotor, it is necessary to pay attention to not only the phase estimating method but also a high-frequency voltage injection method making up an estimating system together with the phase estimating method. However, the prior inventions require a troublesome high-frequency voltage injection means as is noted in Japanese Patent Application Publication No. 2009-171680, Japanese Patent Application Publication No. 2007-185080, Japanese Patent Application Publication No. 2009-171680, Japanese Patent Application Publication No. 2009-273254, and Japanese Patent Application Publication No. 2009-273283, describing that "a rectangular-wave alternating high-frequency voltage consisting of two pulse voltages equal in amplitude and pulse width to each other but differing in polarity from each other is applied to a motor in a plurality of vector directions".

SUMMARY OF THE INVENTION

Preferred embodiments of the present invention are able:

(1) to provide a rotor phase/speed estimating device which does not require any dynamic processing for separating and detecting a high-frequency current from a stator current, which does not need any narrow bandpass filter arranged to accurately detect only a high-frequency component, which can achieve high stability in principle and which does not involve any phase lag or phase advance;

(2) to provide a rotor phase/speed estimating device which can generate a correlation signal capable of having a broad positive correlation region and which is less susceptible to estimation instability otherwise caused by sudden disturbance; and (3) to provide a rotor phase/speed estimating device which can use a simple high-frequency voltage injection device and which can be realized with ease.

A first preferred embodiment of the present invention provides a rotor phase/speed estimating device for an AC motor in which a rotor shows a salient pole characteristic with respect to a high-frequency current having a frequency higher than a drive frequency, the estimating device being arranged to perform a stator voltage injection function and a stator current detection function, the estimating device including: a high-frequency voltage injection unit arranged to superimpose a high-frequency voltage having a zero DC component and using a high frequency $\omega_h$ as a fundamental frequency onto a drive voltage and then apply the superimposed high-frequency voltage to the AC motor, on a γ-δ semi-synchronous coordinate system including a γ axis to be synchronized with a phase of a rotating rotor with a fixed phase difference represented by a zero phase difference and a δ axis orthogonal to the γ axis; a high-frequency current amplitude detection unit of a fundamental wave component arranged to detect a primary Fourier coefficient equivalent value by obtaining a stator current from the drive control device and then subjecting the stator current or the γ axis and δ axis components of a high-frequency current equivalent value obtained by processing the stator current, to Fourier series development equivalent processing in which a high frequency $\omega_h$ is used as a fundamental frequency; a correlation signal generation unit arranged to generate a correlation signal having correlation with a rotor phase evaluated on the γ-δ semi-synchronous coordinate system, using the Fourier coefficient equivalent value detected from the γ axis and δ axis components; and a rotor phase generation unit arranged to generate a phase of the γ-δ semi-synchronous coordinate system and at least one of an estimated value of the rotor phase and an estimated value of a rotor speed basically remaining in a differential and integral calculus relationship with the rotor phase.

A preferred embodiment of the present invention provides a rotor phase/speed estimating device for an AC motor in which a rotor shows a salient pole characteristic with respect to a high-frequency current having a frequency higher than a drive frequency, the estimating device being arranged to perform a stator voltage injection function and a stator current detection function, the estimating device including: a high-frequency voltage injection unit arranged to superimpose a high-frequency voltage having a zero DC component and using a high frequency $\omega_h$ as a fundamental frequency onto a drive voltage and then applying the superimposed high-frequency voltage to the AC motor, on a γ-δ semi-synchronous coordinate system including a γ axis to be synchronized with a phase of a rotating rotor with a fixed phase difference represented by a zero phase difference and a δ axis orthogonal to the γ axis; a high-frequency current amplitude detection unit of a fundamental wave component arranged to detect a primary Fourier coefficient equivalent value by obtaining a stator current from the drive control device and then subjecting the stator current or one of the γ axis and δ axis components of a high-frequency current equivalent value obtained by processing the stator current, to Fourier series development equivalent processing in which a high frequency $\omega_h$ is used as a fundamental frequency; and a rotor phase generation unit arranged to generate a phase of the γ-δ semi-synchronous coordinate system and at least one of an estimated value of the rotor phase and an estimated value of a rotor speed basically remaining in a differential and integral calculus relationship with the rotor phase, by treating the detected Fourier coefficient equivalent value as a correlation signal having correlation with the rotor phase evaluated on the γ-δ semi-synchronous coordinate system and by using the Fourier coefficient equivalent value or a value several times larger than the Fourier coefficient equivalent value.

In a preferred embodiment of the present invention, the high-frequency voltage injected by the high-frequency voltage injection unit preferably is a sinusoidal voltage expressed by a trigonometric function in which a time integration value of the high frequency $\omega_h$ is used as a variable.

Effects provided by a preferred embodiment of the present invention will be described using numerical formulae. FIG. 1 is referred to. In FIG. 1, there are depicted a d-q synchronous coordinate system in which a d axis (major axis) is perfectly synchronized with a rotor phase without any phase difference, an α-β fixed coordinate system in which the phase of an α axis (major axis) is equal to the u-phase coil phase of a stator, and a γ-δ semi-synchronous coordinate system having a γ axis (major axis) to be synchronized with a rotor phase with a fixed phase difference represented by a zero phase difference. In FIG. 1, the instantaneous speed of a rotor of the γ-δ semi-synchronous coordinate system is expressed by $\omega_\gamma$.

At a certain moment, the rotor makes a phase $\theta_\gamma$ with respect to the $\gamma$ axis. As for the polarity of a rotation direction, the direction of rotation from a major axis ($\gamma$ axis) to a minor axis ($\delta$ axis) is regarded as a forward direction.

In the following description, it is assumed that, with no loss of generality, the $\gamma$-$\delta$ semi-synchronous coordinate system works towards becoming synchronized with a rotor phase with a zero phase difference. In other words, it is assumed that the $\gamma$-$\delta$ semi-synchronous coordinate system works towards converging with the d-q synchronous coordinate system. The motor is assumed to rotate in the forward direction. The rotation of the motor includes zero speed rotation. It is assumed that the basic frequency $\omega_h$ of a high-frequency voltage superimposed on a drive voltage for the sake of rotor phase estimation is positive. This assumption is merely for the purpose of simplifying description. This assumption does not impair the generality of description nor impair the essence of the principle of various preferred embodiments of the present invention. The assumption mentioned above may well be injected to the high-frequency voltage shown in equations (1) through (6). The high-frequency voltage having a sinusoidal form can be expressed using a trigonometric function, i.e., one of a cosine function and a sine function. In describing various preferred embodiments of the present invention, for the sake of assuring simplicity of description, the $\gamma$ axis component (first component) of an applied voltage is expressed by a cosine function just like the high-frequency voltage shown in equations (1) through (5). The phases of other signals are expressed on the basis of the $\gamma$ axis component (first component) of the applied voltage.

Description will be made on the gist of a Fourier series and a Fourier coefficient as one element of a preferred embodiment of the present invention. While the Fourier series includes a complex Fourier series and a trigonometric Fourier series, they are essentially the same. For the sake of simplicity, the trigonometric Fourier series is used in describing the effects of various preferred embodiments of the present invention. A periodic signal f(t) having a period $T_h$ is considered. The periodic signal is developed as a trigonometric Fourier series.

Formula 7

$$f(t) = \frac{a_0}{2} + \sum_{n=1}^{\infty} a_n \cos\left(n\frac{2\pi}{T_h}t\right) + \sum_{n=1}^{\infty} b_n \sin\left(n\frac{2\pi}{T_h}t\right) \quad (7a)$$

Formula 8

$$a_n = \frac{2}{T_h}\int_{-T_h/2+t_1}^{T_h/2+t_1} f(t)\cos\left(n\frac{2\pi}{T_h}t\right)dt;\ n = 0, 1, 2, \ldots \quad (7b)$$

Formula 9

$$b_n = \frac{2}{T_h}\int_{-T_h/2+t_1}^{T_h/2+t_1} f(t)\sin\left(n\frac{2\pi}{T_h}t\right)dt;\ n = 1, 2, \ldots \quad (7c)$$

The $t_1$ in equations (7b) and (7c) defining the trigonometric Fourier coefficients $a_n$ and $b_n$ denotes an arbitrary time in a time zone in which a periodic signal is defined.

If the generalized elliptical high-frequency voltage of equation (1) is injected to an AC motor whose rotor shows a salient pole characteristic with respect to a high-frequency current, the following high-frequency current flows as a response to the high-frequency voltage injected.

Formula 10

$$i_{1h} = \frac{V_h}{\omega_h L_d L_q}\begin{bmatrix} a & b_1 \\ c & d_1 \end{bmatrix}\begin{bmatrix} \sin\omega_h t \\ \cos\omega_h t \end{bmatrix} = I_1 \begin{bmatrix} a & b_1 \\ c & d_1 \end{bmatrix}\begin{bmatrix} \sin\omega_h t \\ \cos\omega_h t \end{bmatrix} \quad (8a)$$

Formula 11

$$\left.\begin{array}{l} a = L_i - L_m\cos2\theta_\gamma \\ b_1 = KL_m\sin2\theta_\gamma \\ c = -L_m\sin2\theta_\gamma \\ d_1 = -K(L_i + L_m\cos2\theta_\gamma) \end{array}\right\} \quad (8b)$$

In the equations expressed above, the $L_d$ and $L_q$ are d-axis and q-axis inductances with respect to the high-frequency current. The $L_i$ and $L_m$ are in-phase and mirror-phase inductances having the following relationship with the d-axis and q-axis inductances.

Formula 12

$$\begin{bmatrix} L_d \\ L_q \end{bmatrix} = \begin{bmatrix} 1 & 1 \\ 1 & -1 \end{bmatrix}\begin{bmatrix} L_i \\ L_m \end{bmatrix} \quad (9)$$

If the fixed circular high-frequency voltage of equation (2) is injected to an AC motor whose rotor shows a salient pole characteristic with respect to a high-frequency current, the following high-frequency current flows as a response to the high-frequency voltage injected.

Formula 13

$$i_{1h} = \frac{V_h}{(\omega_h + \omega_\gamma)L_d L_q}\begin{bmatrix} a & b_2 \\ c & d_2 \end{bmatrix}\begin{bmatrix} \sin\omega_h t \\ \cos\omega_h t \end{bmatrix} = I_2 \begin{bmatrix} a & b_2 \\ c & d_2 \end{bmatrix}\begin{bmatrix} \sin\omega_h t \\ \cos\omega_h t \end{bmatrix} \quad (10a)$$

Formula 14

$$\left.\begin{array}{l} a = L_i - L_m\cos2\theta_\gamma \\ b_2 = L_m\sin2\theta_\gamma \\ c = -L_m\sin2\theta_\gamma \\ d_2 = -(L_i + L_m\cos2\theta_\gamma) \end{array}\right\} \quad (10b)$$

If the constant-amplitude non-rotational high frequency voltage of equation (3) is injected to an AC motor whose rotor shows a salient pole characteristic with respect to a high-frequency current, the following high-frequency current flows as a response to the high-frequency voltage injected.

Formula 15

$$i_{1h} = \frac{\omega_h V_h}{(\omega_h^2 - \omega_\gamma^2)L_d L_q}\begin{bmatrix} a & b_3 \\ c & d_3 \end{bmatrix}\begin{bmatrix} \sin\omega_h t \\ \cos\omega_h t \end{bmatrix} = I_3 \begin{bmatrix} a & b_3 \\ c & d_3 \end{bmatrix}\begin{bmatrix} \sin\omega_h t \\ \cos\omega_h t \end{bmatrix} \quad (11a)$$

Formula 16

$$\left.\begin{array}{l} a = L_i - L_m\cos2\theta_\gamma \\ b_3 = -K_\omega L_m\sin2\theta_\gamma \\ c = -L_m\sin2\theta_\gamma \\ d_3 = K_\omega(L_i + L_m\cos2\theta_\gamma) \end{array}\right\} \quad (11b)$$

-continued

Formula 17

$$K_\omega = \frac{\omega_\gamma}{\omega_h} \quad (11c)$$

As can be appreciated from equations (8), (10) and (11), if a sinusoidal high-frequency voltage is injected, the high-frequency current as a response to the sinusoidal high-frequency voltage can be expressed as follows.

Formula 18

$$i_{1h} = \begin{bmatrix} i_{\gamma h} \\ i_{\delta h} \end{bmatrix} = I_i \begin{bmatrix} a & b_i \\ c & d_i \end{bmatrix} \begin{bmatrix} \sin\omega_h t \\ \cos\omega_h t \end{bmatrix} = \begin{bmatrix} \tilde{a}_i & \tilde{b}_i \\ \tilde{c}_i & \tilde{d}_i \end{bmatrix} \begin{bmatrix} \sin\omega_h t \\ \cos\omega_h t \end{bmatrix} \quad (12)$$

In the equation expressed above, the subscripts $\gamma$ and $\delta$ signify a $\gamma$ axis component and a $\delta$ axis component of the high-frequency current as a 2×1 vector on a $\gamma$-$\delta$ semi-synchronous coordinate system. The $I_i$ in equation (12) denotes an amplitude component attributable to a high-frequency voltage, a frequency and a stator inductance. The variables a, $b_i$, c, and $d_i$ denote amplitude components including rotor phases. Specific values thereof are the same as shown in equations (8), (10) and (11). The high-frequency current expressed in equation (12) describes an elliptical locus. FIG. 2 depicts one example of the locus of the high-frequency current on the $\gamma$-$\delta$ semi-synchronous coordinate system.

Consideration is given to a case where a high-frequency voltage is superimposed and injected to a drive current on a $\gamma$-$\delta$ semi-synchronous coordinate system. The resultant stator current $i_1$ is expressed by equation (12) as follows Formula 19

$$i_1 = \begin{bmatrix} i_\gamma \\ i_\delta \end{bmatrix} = i_{1f} + i_{1h} = \begin{bmatrix} i_{\gamma f} \\ i_{\delta f} \end{bmatrix} + \begin{bmatrix} i_{\gamma h} \\ i_{\delta h} \end{bmatrix} = \begin{bmatrix} i_{\gamma f} \\ i_{\delta f} \end{bmatrix} + \begin{bmatrix} \tilde{a}_i & \tilde{b}_i \\ \tilde{c}_i & \tilde{d}_i \end{bmatrix} \begin{bmatrix} \sin\omega_h t \\ \cos\omega_h t \end{bmatrix} \quad (13)$$

The stator current $i_1$ is expressed as a vector sum of a drive current $i_{1f}$ and a high-frequency current $i_{1h}$. The subscript f indicates a drive signal.

In equation (13), the rotor phase information is included in the amplitudes a, $b_i$, c and $d_i$ of the high-frequency components. Using the Fourier coefficient deciding method of equations (7b) and (7c), the amplitudes can be detected as follows.

Formula 20

$$\tilde{a}_i = I_i a = \frac{\omega_h}{\pi} \int_{t-T_h}^{t} i_\gamma \sin\omega_h \tau d\tau \quad (14a)$$

Formula 21

$$\tilde{b}_i = I_i b_i = \frac{\omega_h}{\pi} \int_{t-T_h}^{t} i_\gamma \cos\omega_h \tau d\tau \quad (14b)$$

Formula 22

$$\tilde{c}_i = I_i c = \frac{\omega_h}{\pi} \int_{t-T_h}^{t} i_\delta \sin\omega_h \tau d\tau \quad (14c)$$

Formula 23

$$\tilde{d}_i = I_i d_i = \frac{\omega_h}{\pi} \int_{t-T_h}^{t} i_\delta \cos\omega_h \tau d\tau \quad (14d)$$

Formula 24

$$T_h = \frac{2\pi}{\omega_h} \quad (15)$$

In reality, the definite integral of equation (14) is approximately performed on a discrete-time basis. It is assumed that the extraction period $T_s$ for discrete-time has a relationship of integer N with the period $T_h$ of equation (22) as expressed below.

Formula 25

$$T_h = NT_s \quad (16)$$

At this time, the definite integral of the following equation (17a) is discretely and approximately performed every detection period as expressed by equation (17b).

Formula 26

$$y(t) = \frac{\omega_h}{\pi} \int_{t-T_h}^{t} x(\tau) d\tau \quad (17a)$$

Formula 27

$$\begin{aligned} y(kT_s) &\approx \frac{\omega_h}{\pi} \sum_{i=0}^{N-1} x((k-i)T_s)T_s = \frac{2}{N} \sum_{i=0}^{N-1} x((k-i)T_s) \\ &= \frac{2}{N} \left( \sum_{i=0}^{N-1} z^{-i} \right) x(kT_s) \\ &= \frac{2}{N} \cdot \frac{1-z^{-N}}{1-z^{-1}} x(kTs) \\ &\approx \frac{2}{N} \left( \sum_{i=0}^{N-1} r^i z^{-i} \right) x(kT_s) = \frac{2}{N} \cdot \frac{1-r^N z^{-N}}{1-rz^{-1}} x(kT_s) \end{aligned} \quad (17b)$$

Formula 28

$$z^{-1}x(kT_s) = x((k-1)T_s) \quad (17c)$$

Formula 29

$$0 < r < 1 \quad (17d)$$

In this regard, the t is equal to $kT_s$. The $z^{-1}$ is a delay operator as clearly shown in equation (17c). The r is a maximum value less than 1 that can be handled by a microcomputer.

The high-frequency current amplitude detection device of a fundamental wave component of a preferred embodiment of the present invention is arranged to detect a primary Fourier coefficient equivalent value by obtaining a stator current from the drive control device and then subjecting the stator current or the $\gamma$ axis and $\delta$ axis components of a high-frequency current equivalent value obtained by processing the stator current, to the Fourier series development equivalent processing in which a high frequency $\omega_h$ is used as a fundamental frequency. More specifically, the stator current of equation (13) is subjected to the Fourier coefficient processing of equation (14), thereby detecting a primary Fourier coefficient equivalent value:

$$\tilde{a}_i, \tilde{b}_i, \tilde{c}_i, \tilde{d}_i \quad \text{Formula 30}$$

In reality, the Fourier coefficient processing of equation (14) is approximately performed on a discrete-time basis as shown in equation (17), one of the equivalent processing. In accordance with a preferred embodiment of the present invention, as set forth later in detail, it is possible to withdraw or change the integral action coefficient $\omega_h/\Pi$ of equations (14) and (17a) to determine the primary Fourier coefficient equivalent value and the approximate integral action coefficient $2/N$ of equation (17b). In various preferred embodiments of the present invention, considering the withdrawal and change of the integral action coefficient, the term "primary Fourier coefficient equivalent value" is used in place of the term "primary Fourier coefficient".

It should be noted that the definite integral processing of equation (14) can be approximately performed, for example, preferably by lowpass filter processing. In general, the following approximation is established between the definite integral processing of equation (17a) and the processing performed by a lowpass filter $F(s)$.

Formula 31

$$y(t) = \frac{\omega_h}{\pi} \int_{t-T_h}^{t} x(\tau) d\tau \approx 2F(s)x(t); F(0) = 1 \quad (18)$$

In accordance with a preferred embodiment of the present invention, considering the approximation processing of equation (18), use is made of the term "Fourier series development equivalent processing".

As is apparent from the foregoing description, the Fourier coefficient equivalent value is preferably obtained by subjecting the stator current to the Fourier series development equivalent processing. In other words, it is not necessarily required to detect the high-frequency current in advance. In a hypothetical case where the high-frequency current is roughly detected by a DC cut filter, it is possible to use a DC cut filter having a broad enough bandwidth without impairing the stability of the estimating system. In other words, it is sufficient to use the coarse processing to roughly detect the high-frequency current.

In the foregoing description, the generation of the primary Fourier coefficient equivalent value has been described by thinking, as the high-frequency voltage to be injected, the voltage expressed by the trigonometric function in which the time integral value of the high frequency $\omega_h$ is used as a variable (the representative examples of which are equations (1) through (5)). Considering the fact that the Fourier series development equivalent processing has an ability to exclude the influence of the harmonic wave components other than the fundamental wave component, the high-frequency current subjected to the Fourier series development equivalent processing may include the high-frequency wave components other than the fundamental wave component. In various preferred embodiments of the present invention, it is only necessary that the high-frequency voltage injection device arranged to apply a high-frequency voltage to generate the high-frequency current can superpose the high-frequency voltage having a zero DC component and using a high frequency $\omega_h$ as a fundamental frequency onto the drive voltage and can apply the superimposed high-frequency voltage to the AC motor. As the non-sinusoidal high-frequency voltage, it is possible to use the one of equation (6).

In accordance with a preferred embodiment of the present invention, a correlation signal having correlation with the rotor phase evaluated on the $\gamma$-$\delta$ semi-synchronous coordinate system is generated by the correlation signal generation device using the Fourier coefficient equivalent value detected from the $\gamma$ axis and $\delta$ axis components. As a method of generating a correlation signal $P_c$ that places a priority on the expansion of a positive correlation region and the reduction of an operation load, there exist at least the following ones.

Formula 32

$$p_c = \frac{1}{2}\tan^{-1}\left(\frac{K\tilde{c}_1 - \tilde{b}_1}{K\tilde{a}_1 + \tilde{d}_1}\right) = \theta_\gamma; K \neq 0 \quad (19)$$

Formula 33

$$p_c = \frac{1}{2}\tan^{-1}\left(\frac{\tilde{c}_2 - \tilde{b}_2}{\tilde{a}_2 + \tilde{d}_2}\right) = \theta_\gamma \quad (20)$$

Formula 34

$$p_c = \frac{1}{2}\tan^{-1}\left(\frac{K_\omega \tilde{c}_3 + \tilde{b}_3}{K_\omega \tilde{a}_3 - \tilde{d}_3}\right) = \theta_\gamma; K_\omega \neq 0 \quad (21)$$

The correlation signal is substantially the same as the rotor phase $\theta_\gamma$. In other words, the correlation signal has the maximum positive correlation region $\pm \Pi/2(\text{rad})$ in any high-frequency voltage injection method. In addition, the correlation signal has a feature that it is insensitive to the amplitude and frequency of the injected high-frequency voltage and also insensitive to the motor parameters. The correlation signal has a relatively small operation load. On the other hand, the correlation signal cannot be used in a high-frequency voltage injection method in which the amplitudes of positive and negative phase components of the high-frequency current become substantially equal to each other. This means that the correlation signal is lacking in versatility.

As a method of generating the correlation signal $P_c$ that places a priority on the versatility and the positive correlation region, there exists at least the following one.

Formula 35

$$p_c = \frac{1}{2}\tan^{-1}\left(\frac{2(\tilde{a}_i\tilde{c}_i + \tilde{b}_i\tilde{d}_i)}{\tilde{a}_i^2 + \tilde{b}_i^2 - \tilde{c}_i^2 - \tilde{d}_i^2}\right) \quad (22)$$

The correlation signal of equation (22) denotes the major-axis phase $\theta_{\gamma e}$ of the elliptical locus of the high-frequency current (see FIG. 2) and has strong positive correlation with the rotor phase. The correlation signal of equation (22) is so versatile that it can be applied to all high-frequency voltage injection methods. On the other hand, the correlation signal of equation (22) has a feature that, as compared with equations (19) through (21), the operation load thereof grows a little larger. For reference, FIG. 3A shows the correlation characteristic between the rotor phase and the correlation signal in the event that the correlation signal $P_c$ of equation (22) is generated from the high-frequency current of equation (8) which is a response to the generalized high-frequency voltage of equation (1). In FIG. 3A, the elliptical coefficient K is selected to become equal to 0.5.

As a method of generating the correlation signal $P_c$ that places a priority on the positive correlation region and the operation load, there exists at least the following one.

Formula 36

$$p_c = \frac{1}{1+K}\tan^{-1}\left(\frac{\tilde{c}_1 - \tilde{b}_1}{\tilde{a}_1 + \tilde{d}_1}\right); 0 \leq K \leq 1 \quad (23)$$

The correlation signal of equation (23) has a positive correlation region equal to that of the correlation signal of equation (22) but has an operation load smaller than the correlation signal of equation (22). If equation (23) is compared with equations (19) and (20), the operation load of equations (23) is substantially equal to that of equations (19) and (20). The versatility (the selection range of the elliptical coefficient K) of equation (23) is superior to that of equations (19) and (20). The positive correlation region of equations (19) and (20) is larger than that of equation (23). If the elliptical coefficient K is selected to become equal to 1, the positive correlation region of equation (23) becomes equal to that of equations (19) and (20).

As a correlation signal that can reduce the operation load while maintaining the high versatility, namely the availability in all high-frequency voltage injection method, there exists at least the following one.

Formula 37

$$p_c = \tan^{-1}\left(\frac{\tilde{c}_i}{\tilde{a}_i}\right) \quad (24)$$

FIG. 3B shows the correlation characteristic between the rotor phase and the correlation signal. In the correlation signal, the positive correlation region is significantly reduced at the expense of the increased versatility and simplicity. In case of a motor having a large salient pole ratio $r_s$ ($=-L_m/L_i=0.5$), it is possible to secure a relatively large positive correlation region of 1.2 (rad). However, only a small positive correlation region of about 0.8 (rad) is obtained in case of a motor having a small salient pole ratio $r_s$ ($=0.1$).

In the positive correlation signal generation methods illustrated in equations (19) through (24), as is apparent from the generation principle, it is possible to use the relative ratio of the high-frequency component amplitude (the primary Fourier coefficient):

$$\tilde{a}_i, \tilde{b}_i, \tilde{c}_i, \tilde{d}_i \quad \text{Formula 38}$$

Accordingly, if the positive correlation signal generation methods are used, it is possible to withdraw or change the integral action coefficient $\omega_p/\Pi$ of equations (14) and (17a) for determining the primary Fourier coefficient equivalent value and the approximate integral action coefficient 2/N of equation (17b).

In accordance with a preferred embodiment of the present invention, the rotor phase generation device is arranged to generate a phase of a γ-δ semi-synchronous coordinate system and at least one of an estimated value of a rotor phase and an estimated value of a rotor speed basically remaining in a calculus relationship with the rotor phase. The rotor phase generation device may preferably be easily configured on the basis of a generalized integral type PLL method. The generalized integral type PLL method (see Shinji Shinnaka: "Vector Control Technology of Permanent-Magnet Synchronous Motor (Volume II, The Essence of Sensor-less Drive)", Sangyo-Tosho (2008-12)) is given by the following equations.

Formula 39

$$\omega_\gamma = C(s)p_c \quad (25a)$$

Formula 40

$$\hat{\theta}_\alpha = \frac{1}{s}\omega_\gamma \quad (25b)$$

Formula 41

$$C(s) = \frac{C_N(s)}{C_D(s)} = \frac{c_{nm}s^m + c_{nm-1}s^{m-1} + \ldots + c_{n0}}{s^{m-1} + c_{dm-1}s^{m-2} + \ldots + c_{d1}} \quad (25c)$$

As can be readily understood from the fact that the influence of the amplitude and high frequency of the injected high-frequency voltage is excluded in generating the correlation signal, it is not necessary to change or redesign a phase controller C(s) along with the change of the amplitude and high frequency of the injected high-frequency voltage.

According to a preferred embodiment of the present invention, the phase controller can obtain sufficient performance with the following primary controller (PI controller).

Formula 42

$$C(s) = \frac{C_N(s)}{C_D(s)} = \frac{c_{n1}s + c_{n0}}{s} = c_{n1} + \frac{c_{n0}}{s} \quad (26)$$

The $\omega_\gamma$ of equation (25b) is the speed of the γ-δ semi-synchronous coordinate system. The Formula 43 $\hat{\theta}_\alpha$ of equation (25c) is the phase evaluated from the α axis of the γ-δ semi-synchronous coordinate system. As is apparent from equation (25c), these signals remain in a calculus relationship with each other. Since the γ-δ semi-synchronous coordinate system is a coordinate system aiming at following a d-q synchronous coordinate system, the signals become an estimated speed value and an estimated phase value of the rotor.

As is apparent from the foregoing description, first preferred embodiments of the present invention provide the following characteristics to the rotor phase/speed estimating device.

(1) It is possible to provide a rotor phase/speed estimating device which does not require any dynamic processing to separate and detect a high-frequency current from a stator current, which does not need any narrow bandpass filter to accurately detect only a high-frequency component, which can enjoy high stability in principle and which does not involve any phase lag or phase advance.

(2) As can be noted from the representative example illustrated in equations (19) through (21), it is possible to provide a rotor phase/speed estimating device which can generate a correlation signal capable of having a broad positive correlation region and which is less susceptible to estimation instability otherwise caused by sudden disturbance.

(3) It is possible to provide a rotor phase/speed estimating device which can use a simple high-frequency voltage injection device as can be seen from the representative example illustrated in equations (1) through (6) and which can realize rotor phase/speed estimation with ease as described with reference to equations (14) through (26) (In this regard, description will be made later through the first preferred embodiments of the present invention shown in FIGS. 4 through 8).

Next, description will be made on the effects provided by second preferred embodiments of the present invention. The second preferred embodiments of the present invention differ from the first preferred embodiments of the present invention in terms of two points. The first difference resides in that a high-frequency current amplitude detection device of a fundamental wave component detects a primary Fourier coefficient equivalent value by subjecting the stator current or one of the γ axis and δ axis components of the high-frequency current equivalent value obtained by processing the stator current, to the Fourier series development equivalent processing in which a high frequency $\omega_h$ is used as a fundamental frequency. In the first preferred embodiments of the present invention, the primary Fourier coefficient equivalent value is detected by subjecting all the γ axis and δ axis components to the Fourier series development equivalent processing. In contrast, the second preferred embodiments of the present invention detect the primary Fourier coefficient equivalent value by subjecting one of the γ axis and δ axis components to the Fourier series development equivalent processing.

The second difference of the second preferred embodiments of the present invention with respect to the first preferred embodiments of the present invention resides in that a Fourier coefficient equivalent value is treated as a correlation signal having correlation with the rotor phase evaluated on the γ-δ semi-synchronous coordinate system and an estimated rotor phase value is generated using the Fourier coefficient equivalent value or a value several times larger than the Fourier coefficient equivalent value. In the first preferred embodiments of the present invention, a correlation signal generation device arranged to generate a correlation signal having correlation with the rotor phase evaluated on the γ-δ semi-synchronous coordinate system using the Fourier coefficient equivalent value detected from the γ axis and δ axis components is preferably included. In the second preferred embodiments of the present invention, however, the Fourier coefficient equivalent value or a value several times larger than the Fourier coefficient equivalent value is treated as a correlation signal. For that reason, there is no need to include a correlation signal generation device.

As the correlation signal in the second preferred embodiments of the present invention, it is possible to use the following one which is obtained from the stator current or only the δ axis component of the high-frequency current equivalent value obtained by processing the stator current.

Formula 44

$$p_c = K_\gamma \tilde{c}_i = K_\gamma I_i c = -K_\gamma L_m I_i \sin 2\theta_\gamma \quad (27)$$

In this equation, the $K_\gamma$ is an arbitrary coefficient for multiplying the signal.

As the correlation signal in the second preferred embodiments of the present invention, it is possible to use the following one which is obtained from the stator current or only the γ axis component of the high-frequency current equivalent value obtained by processing the stator current.

Formula 45

$$p_c = K_\delta \tilde{b}_i = K_\delta I_i b_i \quad (28)$$

In this equation, the $K_\delta$ is an arbitrary coefficient for multiplying the signal. In order to use the relationship of equation (28), it is required to comply with a condition that "if the $\theta_\gamma$ is not zero, the $b_i$ is not zero". This imposes a restriction on the high-frequency voltage that can be used.

In case of the second preferred embodiments of the present invention, the operation load required in generating the positive correlation signal $P_c$ is minimized and is preferably smaller than the operation load required in generating any of the correlation signals in the first preferred embodiments of the present invention. However, as the first price to be paid, there is a drawback that the rotor phase and the positive correlation region of the signal will become smallest. As the second price to be paid, the correlation signal includes the amplitude information $I_i$ cancelled and excluded by other positive correlation signals. The amplitude information $I_i$ includes the amplitude and frequency of the high-frequency voltage injected. In order to stably configure the PLL that makes use of the correlation signal $P_C$, it is therefore required to redesign the PLL each time the amplitude and frequency of the high-frequency voltage is changed.

As is apparent from the foregoing description, the second preferred embodiments of the present invention can provide an effect of giving the same characteristics as available in the first preferred embodiments of the present invention to the rotor phase/speed estimating device. While the aforementioned prices have to be paid, the second preferred embodiments of the present invention can preferably provide an effect of giving the same characteristics as available in the first preferred embodiments of the present invention to the rotor phase/speed estimating device with a minimum operation load.

Next, the description will be made on the effects provided by the third preferred embodiments of the present invention. In the third preferred embodiments of the present invention, the high-frequency voltage to be used in the rotor phase/speed estimating device of the first and second preferred embodiments of the present invention is a sinusoidal voltage expressed by a trigonometric function in which a time integration value of the high frequency $\omega_h$ is used as a variable. In case of applying the sinusoidal voltage expressed by the trigonometric function, the corresponding high-frequency current is composed of only a high-frequency fundamental wave component as shown in equations (8), (10) and (11). In other words, the high-frequency current preferably does not include any harmonic wave component. This minimizes the loss such as an ohmic loss or the noise caused by the high-frequency current. In addition, the third preferred embodiments of the present invention can enable the rotor phase/speed estimating device to enjoy the same effects as provided by the first and second preferred embodiments of the present invention with a minimum loss and a minimum noise.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a view showing one example of a preferred embodiment of the relationship between three kinds of coordinate systems and a rotor phase a.

DETAILED DESCRIPTION OF THE PREFERRED EMBODIMENTS

Figure 1:
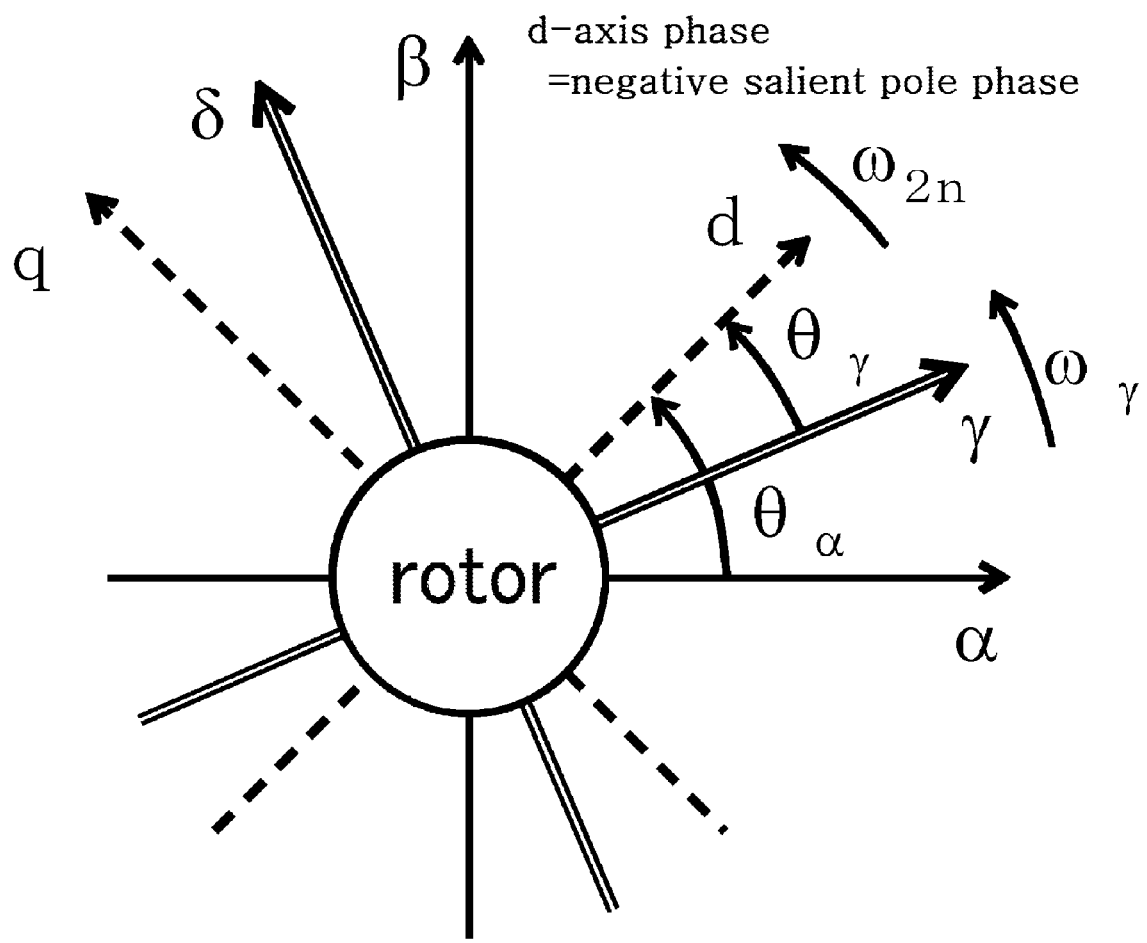
Figure 2:
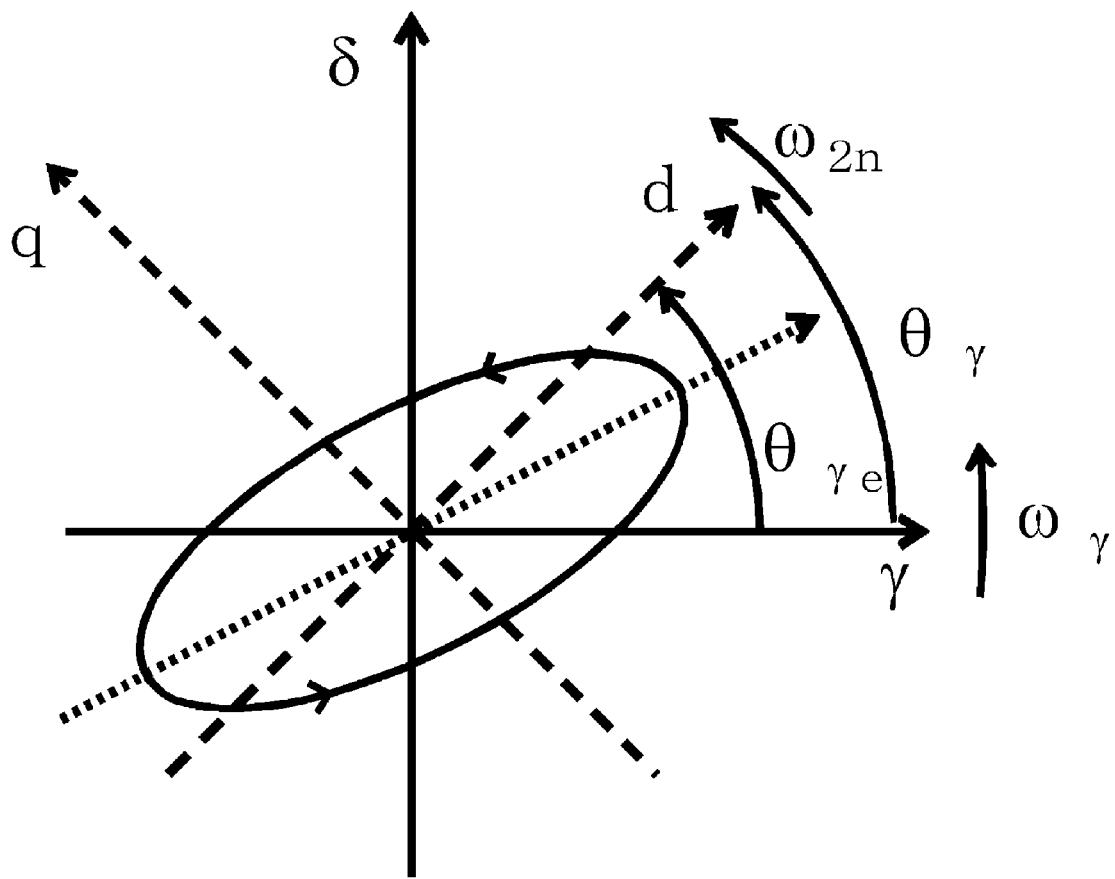
FIG. 2 is a view showing one example of a preferred embodiment of a fundamental wave component locus of a high-frequency current.
Figure 3A:
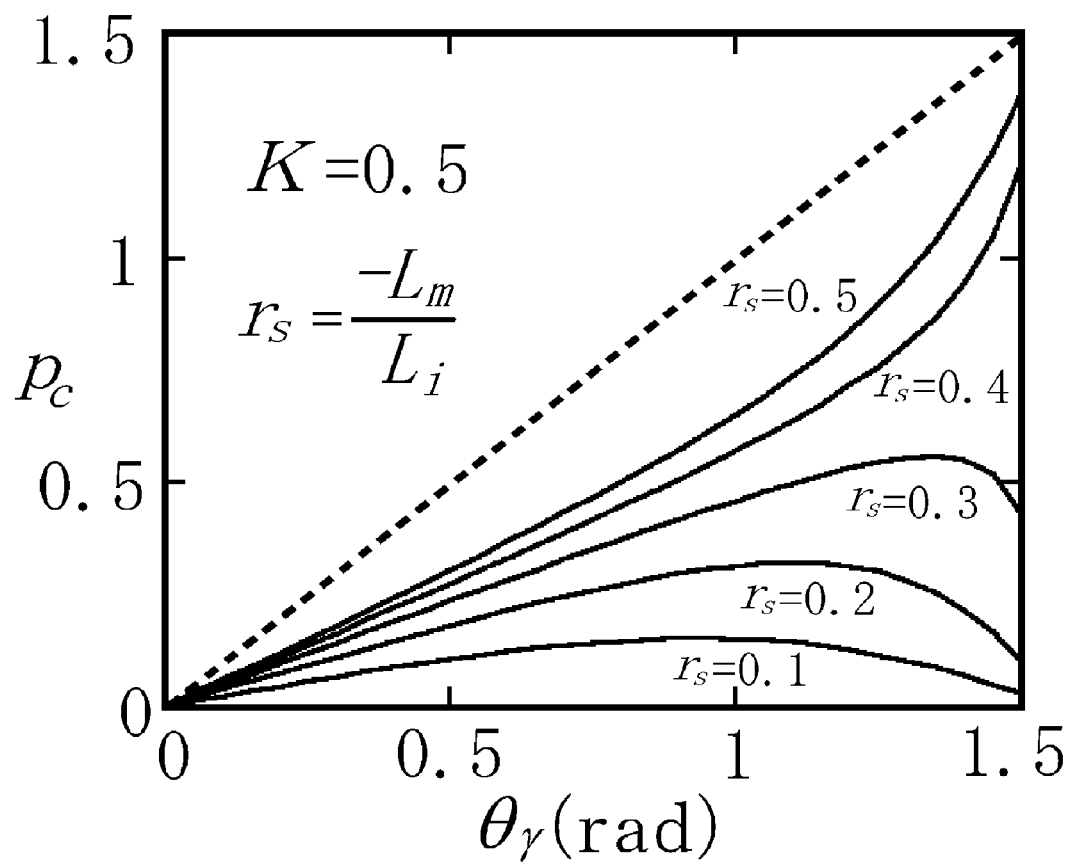
FIG. 3A is a view showing a correlation characteristic between a correlation signal and a rotor phase.
Figure 3B:
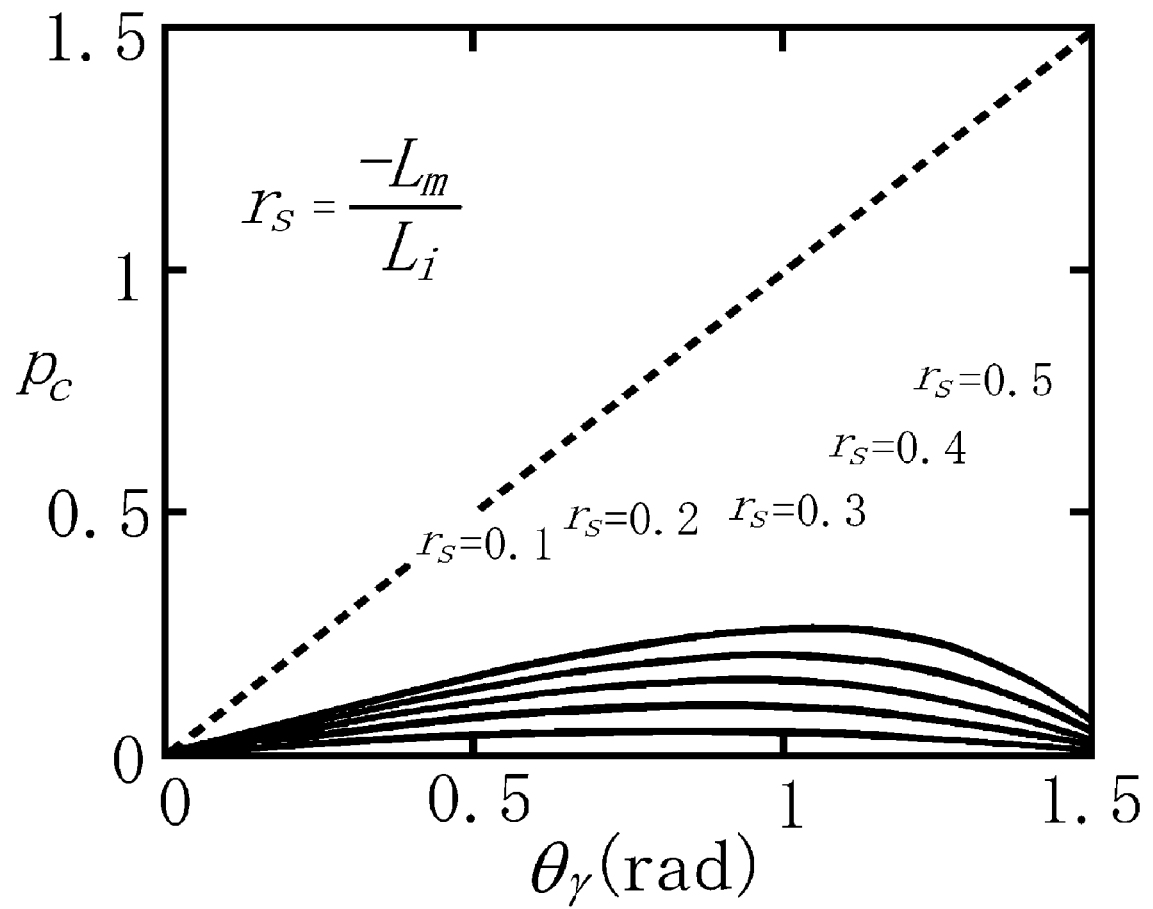
FIG. 3B is a view showing a correlation characteristic between a correlation signal and a rotor phase.
Figure 4:
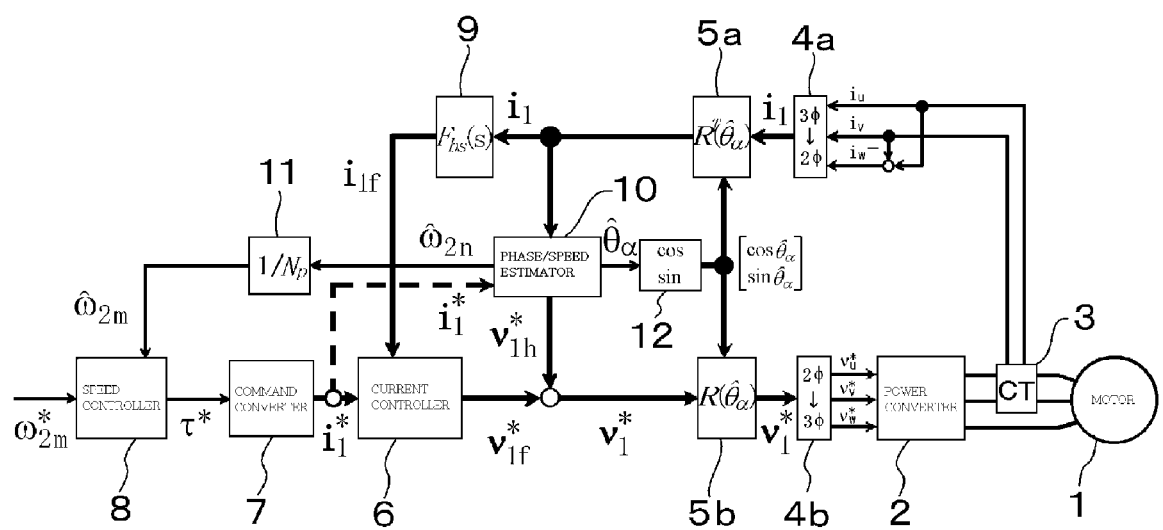
FIG. 4 is a block diagram showing the basic configuration of a drive control device according to a preferred embodiment of the present invention.

Preferred embodiments of the present invention will now be described in detail with reference to the drawings. FIG. 4 shows one example of a drive control device provided with a rotor phase/speed estimating device of a preferred embodiment of the present invention preferably for use in a permanent-magnet synchronous motor which is representative of an AC motor. While preferred embodiments of the present invention are usable as a rotor phase/speed estimating device, for example, a motor drive control system including a drive control device will be first described in order to clearly indicate the position of the rotor phase/speed estimating device in the overall motor drive control system. Reference symbol 1 designates an AC motor. Reference symbol 2 designates a power converter. Reference symbol 3 designates a current detector. Reference symbols 4a and 4b designate a three-phase/two-phase converter and a two-phase/three-phase converter, respectively. Reference symbols 5a and 5b designate vector rotators. Reference symbol 6 designates a current controller. Reference symbol 7 designates a command converter. Reference symbol 8 designates a speed controller. Reference symbol 9 designates a bandstop filter. Reference symbol 10 designates a phase/speed estimator according to a preferred embodiment the present invention. Reference symbol 11 designates a coefficient multiplier. Reference symbol 12 designates a cosine/sine wave generator. In FIG. 4, all the devices 2 through 12 except the motor 1 preferably define the drive control device in accordance with a preferred embodiment of the present invention. In FIG. 4, for the sake of simplicity, a 2×1 vector signal is indicated by a thick signal line. This holds true in other block diagrams.

The three-phase stator current detected by the current detector 3 is converted to a two-phase current on an α-β fixed coordinate system by the three-phase/two-phase converter 4a. Thereafter, the three-phase stator current is converted by the vector rotator 5a to a two-phase current of a γ-δ semi-synchronous coordinate system to be phase-synchronized with the rotor phase with a zero phase difference. A drive current is preferably obtained by excluding a high-frequency current from the converted current through the use of the bandstop filter 9. The drive current is fed to the current controller 6. The current controller 6 generates a drive-purpose two-phase voltage target value of the γ-δ semi-synchronous coordinate system so that the drive-purpose two-phase current of the γ-δ semi-synchronous coordinate system can follow the current target values of the respective phases. Then, the two-phase high-frequency voltage target value received from the phase/speed estimator 10 is superimposed on the drive-purpose two-phase voltage target value. The two-phase voltage target value thus superimposed and combined is sent to the vector rotator 5b. The vector rotator 5b converts the superimposed and combined voltage target value of the γ-δ semi-synchronous coordinate system to a two-phase voltage command value of the α-β fixed coordinate system and sends the two-phase voltage target value to the two-phase/three-phase converter 4b. The two-phase/three-phase converter 4b converts the two-phase voltage target value to a three-phase voltage target value and outputs the three-phase voltage target value as a final target value to be inputted to the power converter 2. The power converter 2 generates electric power corresponding to the target value and applies the electric power to the AC motor 1, thereby driving the AC motor 1.

The phase/speed estimator 10 receives the stator current as an output of the vector rotator 5a (if necessary, receives the target value of the drive current) and outputs a rotor phase estimated value, a electric speed estimated value of a rotor and a high-frequency voltage target value. The rotor phase estimated value is converted to a cosine/sine wave by the cosine/sine wave generator 12 and is then delivered to the vector rotators 5a and 5b to determine the γ-δ semi-synchronous coordinate system. This means that the rotor phase estimated value is preferably used as the phase of the γ-δ semi-synchronous coordinate system.

The two-phase current target value of the γ-δ semi-synchronous coordinate system is preferably obtained by converting a torque target value with the command converter 7. The rotor speed estimated value (electric speed estimated value), one of the output signals of the phase/speed estimator 10, is preferably converted to a mechanical speed estimated value by multiplying an inverse number of a fixed pole logarithm Np with the coefficient multiplier 11 and is then sent to the speed controller 8. In FIG. 4 that shows one configuration example of a speed control system, the torque target value is obtained as an output of the speed controller 8. It should be noted that the speed controller 8 is not needed in case where the purpose of control is to control torque and the speed control system is not configured. In that case, the torque target value is directly applied from the outside.

In preferred embodiments of the present invention, the phase/speed estimator 10 preferably has substantially the same meaning as the rotor phase/speed estimating device. In either the speed control or the torque control, there is no need to make any change to the phase/speed estimator 10. Even if the motor to be driven is replaced by other AC motors, it is not necessary to make any change to the phase/speed estimator 10. Now, description will be provided of preferred embodiments of the phase/speed estimator 10 without losing the generality of the control modes such as the speed control and the torque control and without losing the generality of the of the AC motor to be driven.

First Preferred Embodiment

Figure 5:
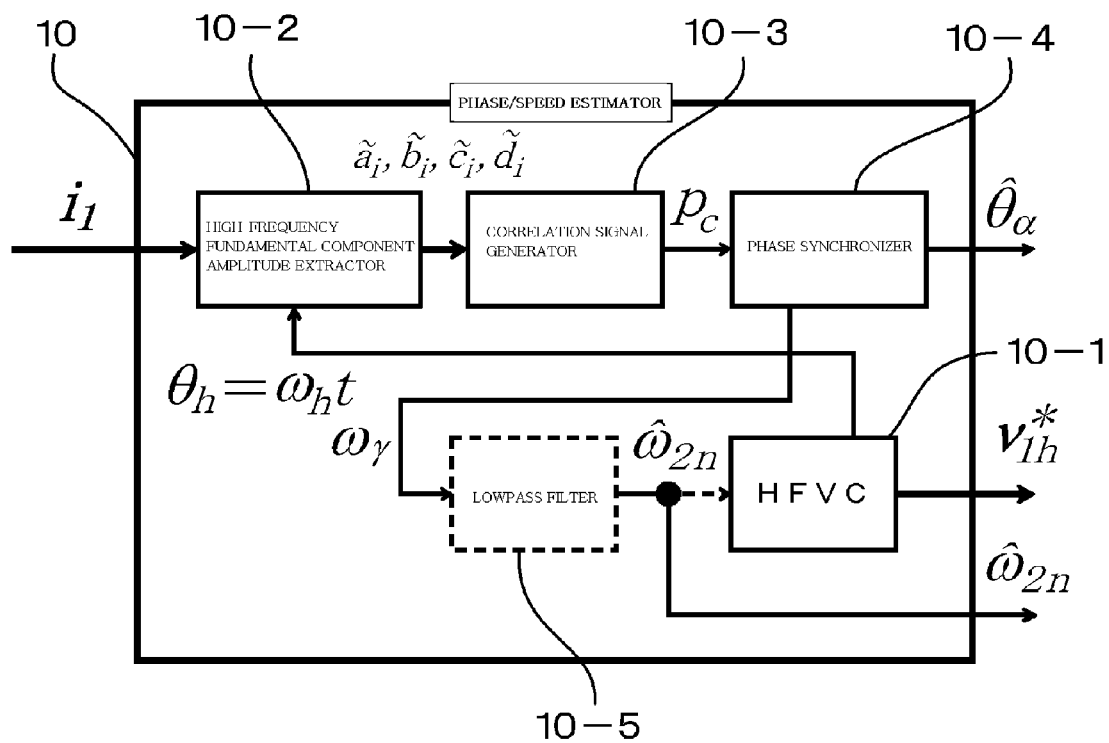
FIG. 5 is a block diagram showing the basic configuration of a phase/speed estimator according to a preferred embodiment of the present invention.

FIG. 5 shows a first preferred embodiment of the phase/speed estimator 10. The phase/speed estimator 10 preferably includes four devices, namely a high-frequency voltage command generator (HFVC) 10-1 arranged to provide a high-frequency voltage injection device, a high-frequency amplitude detector of a fundamental component 10-2 arranged to provide a high-frequency current amplitude detection device of a fundamental wave component, a correlation signal generator 10-3 arranged to provide a correlation signal generation device and a phase synchronizer 10-4 arranged to provide a rotor phase generation device.

The high-frequency voltage command generator 10-1 is arranged to generate a high-frequency voltage target value on a dual-axis orthogonal γ-δ semi-synchronous coordinate system in which the rotor phase estimated value is used as a base axis (γ axis) phase. As shown in FIG. 4, the high-frequency voltage command generator 10-1 performs a high-frequency voltage injection task in cooperation with the vector rotator 5b, the two-phase/three-phase converter 4b and the power converter 2 of the drive control device. As the high-frequency voltage target value generated by the high-frequency voltage command generator 10-1, it may be possible to use, e.g., the target values given by equations (1) through (6).

Formula 46

$$v_{1h}^* = V_h \begin{bmatrix} \left(1 + K\frac{\hat{\omega}_{2n}}{\omega_h}\right)\cos\omega_h t \\ \left(K + \frac{\hat{\omega}_{2n}}{\omega_h}\right)\sin\omega_h t \end{bmatrix}; \begin{array}{l} V_h = \text{const} \\ \omega_h = \text{const} \end{array}, 0 \le K \le 1; K = \text{const} \quad (29)$$

Formula 47

$$v_{1h}^* = V_h \begin{bmatrix} \cos\omega_h t \\ \sin\omega_h t \end{bmatrix}; \begin{array}{l} V_h = \text{const} \\ \omega_h = \text{const} \end{array} \quad (30)$$

Formula 48

$$v_{1h}^* = V_h \begin{bmatrix} \cos\omega_h t \\ 0 \end{bmatrix}; \begin{array}{l} V_h = \text{const} \\ \omega_h = \text{const} \end{array} \quad (31)$$

Formula 49

$$v_{1h}^* = V_h \begin{bmatrix} (1+K)\cos\omega_h t \\ K\sin\omega_h t \end{bmatrix}; \begin{array}{l} V_h = \text{const} \\ \omega_h = \text{const} \end{array}, 0 \le K \le 1; K = \text{const} \quad (32)$$

Formula 50

$$v_{1h}^* = V_h \begin{bmatrix} (1+K)\text{sgn}(\cos\omega_h t) \\ K\text{sgn}(\sin\omega_h t) \end{bmatrix}; \begin{array}{l} V_h = \text{const} \\ \omega_h = \text{const} \end{array}, 0 \le K \le 1; K = \text{const} \quad (33)$$

In a case where a sinusoidal voltage expressed by a trigonometric function is applied, it is preferably possible to use, e.g., the high-frequency voltage target values of equations (29) through (32) which are based on equations (1) through (5). The speed $\omega_\gamma$ of the γ-δ semi-synchronous coordinate system is used as the rotor speed estimated value. Alternatively, instead of the coordinate system speed $\omega_\gamma$, a signal processed by the lowpass filter 10-5 may preferably be used as the speed estimated value. The lowpass filter 10-5 used at this time may preferably be a simple primary filter or any other desirable type of filter. Considering the fact that the lowpass filter 10-5 is used or not used at the user's discretion, the lowpass filter 10-5 is indicated by a broken line in FIG. 5. In equation (29), the high-frequency voltage target value is preferably generated by using the rotor speed in place of the speed $\omega_\gamma$ of the γ-δ semi-synchronous coordinate system. Considering the fact that the necessity of the speed information in the high-frequency voltage command generator depends on the high-frequency voltage to be used, the speed information signal line leading to the high-frequency voltage command generator is indicated by a broken line in FIG. 5.

The high-frequency voltage target value is superimposed on the drive-purpose voltage command value. The high-frequency voltage is injected to the AC motor through the power converter. Consequently, a high-frequency current flows (see FIG. 4). The high-frequency current is included in the stator current. The high-frequency amplitude detector of a fundamental component 10-2 serves to detect the fundamental wave component of the high-frequency current. The high-frequency amplitude detector of a fundamental component according to a preferred embodiment of the present invention shown in FIG. 5 discretely realizes equation (14) according to equation (17). In other words, the high-frequency current amplitude detector of a fundamental wave component preferably detects a primary Fourier coefficient equivalent value as a high-frequency current fundamental wave component amplitude by subjecting the γ axis and δ axis components of the stator current to the Fourier series development equivalent processing in which a high frequency $\omega_h$ is used as a fundamental frequency. As clearly shown in FIG. 5, the phase information $\omega_h t$ needed in the detection of the primary Fourier coefficient equivalent value is obtained from the high-frequency voltage command generator 10-1. Instead of the phase information $\omega_h t$, the cosine or sine wave thereof may be obtained. At least one primary Fourier coefficient equivalent value is detected with respect to each of the γ axis and δ axis components of the stator current. In view of this point, the output signal of the high-frequency amplitude detector for fundamental component 10-2 is indicated by a vector signal line (thick line) in FIG. 5.

The primary Fourier coefficient equivalent value as the output signal of the high-frequency amplitude detector of a fundamental component 10-2 is sent to the correlation signal generator 10-3. The correlation signal generator 10-3 generates a correlation signal $P_c$ pursuant to, e.g., one of equations (19) through (24), and outputs the correlation signal $P_c$ to the phase synchronizer 10-4.

The phase synchronizer 10-4 as a rotor phase generation device is realized so as to faithfully follow the generalized integral type PLL (equation (25)). In other words, the phase synchronizer 10-4 obtains a correlation signal $P_c$ as an input and then outputs a speed $\omega_\gamma$ of the γ-δ semi-synchronous coordinate system and a rotor phase estimated value expressed by the Formula 51 $\hat{\theta}_\alpha$.

Second Preferred Embodiment

Figure 6:
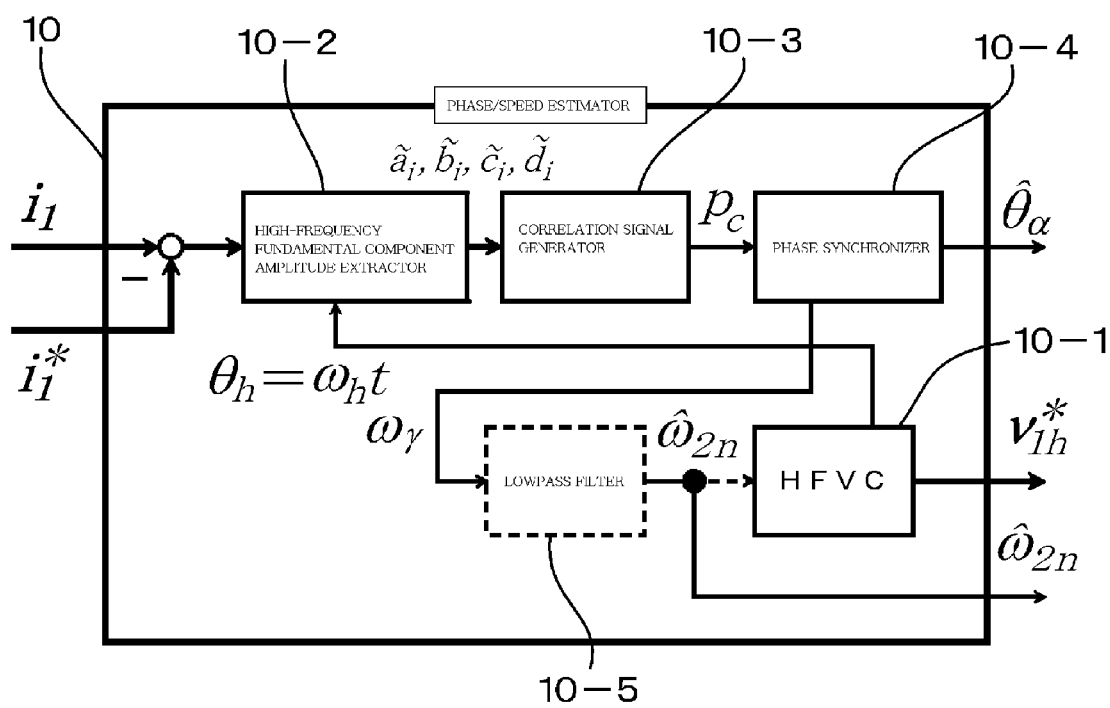
FIG. 6 is a block diagram showing the basic configuration of a phase/speed estimator according to another preferred embodiment of the present invention.

FIG. 6 shows a second preferred embodiment of the present invention. Major components making up the stator current preferably include a drive current of zero frequency and a high-frequency current fundamental wave component. The amplitude of the high-frequency current fundamental wave component is detected by the high-frequency amplitude detector of a fundamental component 10-2. The detection accuracy of the high-frequency current fundamental wave component amplitude can be increased by removing beforehand the major components not to be detected. The preferred embodiment shown in FIG. 6 is based on this point of view. The only difference between the preferred embodiments shown in FIGS. 6 and 5 lies in the signal inputted to the high-frequency amplitude detector of a fundamental component 10-2. Other points remain the same.

The high-frequency amplitude detector of a fundamental component 10-2 of the preferred embodiment shown in FIG. 6 is configured to detect a primary Fourier coefficient equivalent value by subjecting the γ axis and δ axis components of the high-frequency current equivalent value obtained by processing the stator current (namely, the high-frequency current equivalent value obtained by subtracting the drive-purpose current target value from the stator current) to the Fourier series development equivalent processing in which a high frequency $\omega_h$ is used as a fundamental frequency.

Third Preferred Embodiment

Figure 7:
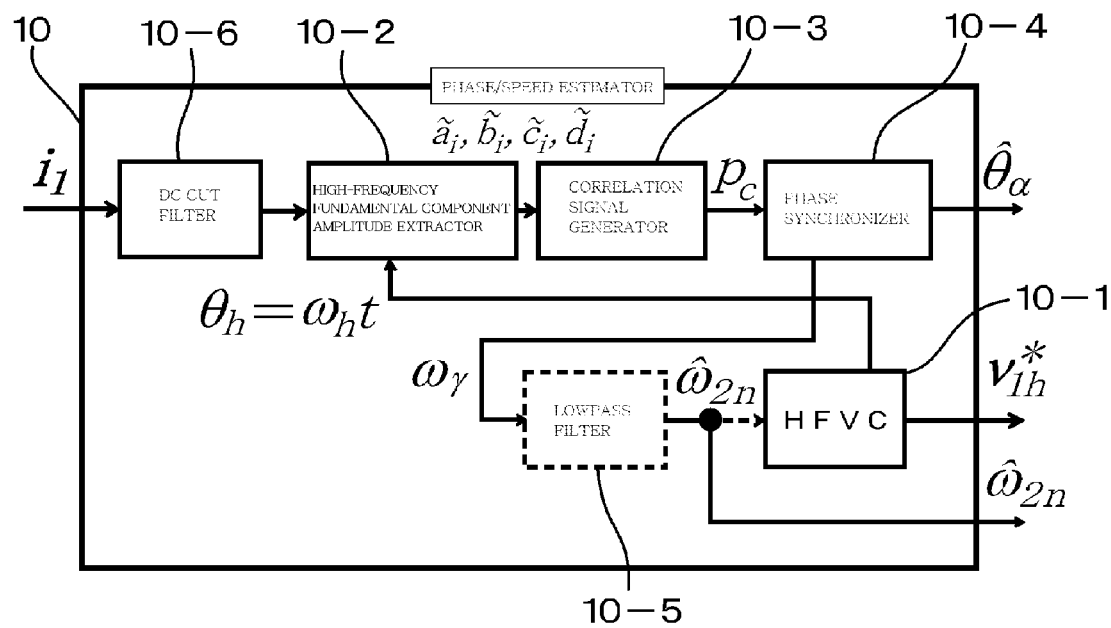
FIG. 7 is a block diagram showing the basic configuration of a phase/speed estimator according to a further preferred embodiment of the present invention.

FIG. 7 shows a third preferred embodiment according to the present invention. The only difference between the preferred embodiments shown in FIGS. 7 and 5 lies in the signal inputted to the high-frequency amplitude detector of a fundamental component 10-2. Other points remain the same. In the preferred embodiment shown in FIG. 7, from the same viewpoint as in the preferred embodiment shown in FIG. 6, a DC component is removed from the signal inputted to the high-frequency amplitude detector of a fundamental component 10-2. The DC cut filter 10-6 is used in removing the DC component. The DC cut filter 10-6 can be replaced by a bandpass filter or a highpass filer having a more-than-enough broad bandwidth. The employment of the filer having a more-than-enough broad bandwidth does not adversely affect the stability of a phase estimating system.

The high-frequency amplitude detector of a fundamental component 10-2 of the preferred embodiment shown in FIG. 7 is configured to detect a primary Fourier coefficient equivalent value by subjecting the γ axis and δ axis components of the high-frequency current equivalent value obtained by processing the stator current (namely, the high-frequency current equivalent value obtained by processing the stator current with the DC cut filter) to the Fourier series development equivalent processing in which a high frequency $\omega_h$ is used as a fundamental frequency.

Fourth Preferred Embodiment

Figure 8:
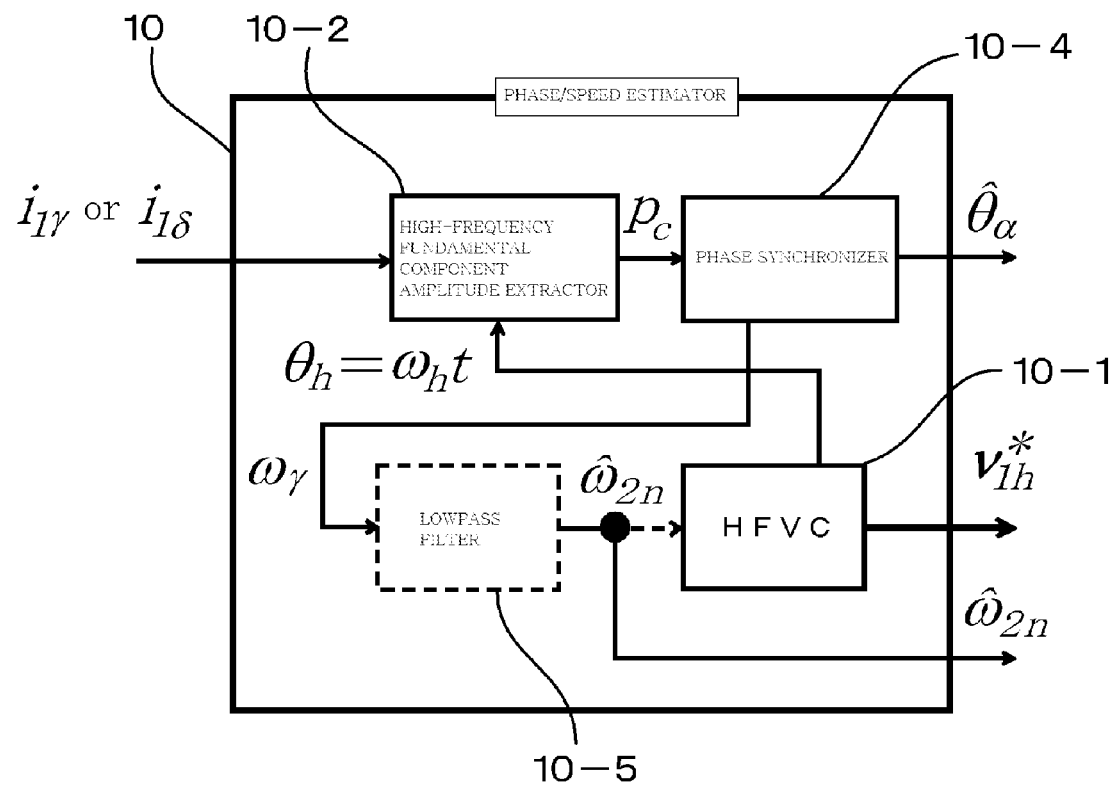
FIG. 8 is a block diagram showing the basic configuration of a phase/speed estimator according to a still further preferred embodiment of the present invention.

Next, description will be provided of a preferred embodiment of the phase/speed estimator 10 in accordance with the present invention. FIG. 8 shows this preferred embodiment. The phase/speed estimator 10 essentially includes three devices, namely a high-frequency voltage command generator (HFVC) 10-1 for realizing a high-frequency voltage injection device, a high-frequency amplitude detector of a fundamental component 10-2 arranged to provide a high-frequency current amplitude detection device of a fundamental component, and a phase synchronizer 10-4 arranged to provide a rotor phase generation device. Major differences in system configuration between FIG. 8 and FIG. 5 which shows one preferred embodiment of the phase/speed estimator 10 in accordance with the present invention are the following two points. The first differing point resides in that the signal inputted to the high-frequency amplitude detector of a fundamental component 10-2 is one of the γ axis and δ axis components of the stator current. The second differing point resides in that the phase/speed estimator shown in FIG. 8 preferably does not include the correlation signal generator 10-3 shown in FIG. 5.

A difference in signal processing between FIG. 8 and FIG. 5 showing one preferred embodiment of the phase/speed estimator 10 in accordance with a preferred embodiment of the present invention resides in the high-frequency amplitude detector for fundamental component 10-2. In the preferred embodiment shown in FIG. 8, equation (27) or (28) is preferably mounted to the high-frequency amplitude detector of a fundamental component by, for example, discrete time realization (see equation (17)). A Fourier coefficient equivalent value or a value several times larger than the Fourier coefficient equivalent value is outputted as a correlation signal. Other signal processing preferably remains the same as that of the preferred embodiment shown in FIG. 5 and, therefore, will not be described.

Fifth Preferred Embodiment

In the preferred embodiment shown in FIG. 8, the signal inputted to the high-frequency amplitude detector of a fundamental component 10-2 is the stator current (one of the γ axis and δ axis components of the stator current). Alternatively, it may be possible to use the high-frequency current equivalent value (one of the γ axis and δ axis components) obtained by processing the stator current. As the method of obtaining the high-frequency current equivalent value (one of the γ axis and δ axis components) by processing the stator current, there are available, e.g., a method of performing subtraction processing through the use of a drive-purpose current target value as shown in FIG. 6 and a method of using a DC cut filter (replaceable by a bandpass filter or a highpass filter having a broad bandwidth) as shown in FIG. 7. Details of these methods are shown in FIGS. 6 and 7 and can be readily understood from the foregoing description by those skilled in the art. Therefore, no description will be made thereon.

In the preferred embodiments shown in FIGS. 4 through 8, the permanent-magnet synchronous motor is preferably used as the AC motor. In general, the drive control devices differ from one another depending on the kinds of the AC motor to be driven (e.g., a permanent-magnet synchronous motor having a permanent magnet arranged in a rotor, a wound-rotor type synchronous motor, a synchronous reluctance motor, a hybrid field-magnet type synchronous motor having a permanent magnet and a field winding arranged in a rotor, an induction motor, etc.). However, the rotor phase/speed estimating device (the phase/speed estimator 10) according to various preferred embodiments of the present invention can be applied to any of the drive control devices with no change. The method of using the rotor phase/speed estimating device (the phase/speed estimator 10) in the drive control device can be readily understood from the preferred embodiments shown in FIGS. 4 through 8. Therefore, no description will be made thereon.

Various preferred embodiments of the present invention can be used in driving an AC motor in a sensor-less manner, for example. In particular, preferred embodiments of the present invention can be suitably used in an application requiring generation of high torque in a low speed range including a zero speed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor phase/speed estimating device for an AC motor in which a rotor shows a salient pole characteristic with respect to a high-frequency current having a frequency higher than a drive frequency, the estimating device being arranged to perform a stator voltage application function and a stator current detection function, the estimating device comprising:

a high-frequency voltage injection unit arranged to superimpose a high-frequency voltage having a zero DC component and using a high frequency $\omega_h$ as a fundamental frequency onto a drive voltage and then to apply the superimposed high-frequency voltage to the AC motor, on a γ-δ semi-synchronous coordinate system composed of a γ axis to be synchronized with a phase of a rotating rotor with a fixed phase difference represented by a zero phase difference and a δ axis orthogonal to the γ axis;

a high-frequency current amplitude detection unit of a fundamental wave component arranged to detect a primary Fourier coefficient equivalent value by obtaining a stator current from the drive control device and then subjecting the stator current or the γ axis and δ axis components of a high-frequency current equivalent value obtained by processing the stator current, to Fourier series development equivalent processing in which a high frequency $\omega_h$ is used as a fundamental frequency;

a correlation signal generation unit arranged to generate a correlation signal having correlation with a rotor phase evaluated on the γ-δ semi-synchronous coordinate system, using the Fourier coefficient equivalent value detected from the γ axis and δ axis components; and a rotor phase generation unit arranged to generate a phase of the γ-δ semi-synchronous coordinate system and at least one of an estimated value of the rotor phase and an estimated value of a rotor speed remaining in a calculus relationship with the rotor phase.

2. A rotor phase/speed estimating device for an AC motor in which a rotor shows a salient pole characteristic with respect to a high-frequency current having a frequency higher than a drive frequency, the estimating device being arranged to perform a stator voltage application function and a stator current detection function, the estimating device comprising:

a high-frequency voltage injection unit arranged to superimpose a high-frequency voltage having a zero DC component and using a high frequency $\omega_h$ as a fundamental frequency onto a drive voltage and then to apply the superimposed high-frequency voltage to the AC motor, on a γ-δ semi-synchronous coordinate system composed of a γ axis to be synchronized with a phase of a rotating rotor with a fixed phase difference represented by a zero phase difference and a δ axis orthogonal to the γ axis;

a high-frequency current amplitude detection unit of a fundamental wave component arranged to detect a primary Fourier coefficient equivalent value by obtaining a stator current from the drive control device and then subjecting the stator current or one of the γ axis and δ axis components of a high-frequency current equivalent value obtained by processing the stator current, to Fourier series development equivalent processing in which a high frequency $\omega_h$ is used as a fundamental frequency; and a rotor phase generation unit arranged to generate a phase of the γ-δ semi-synchronous coordinate system and at least one of an estimated value of the rotor phase and an estimated value of a rotor speed remaining in a calculus relationship with the rotor phase, by treating the detected Fourier coefficient equivalent value as a correlation signal having correlation with the rotor phase evaluated on the γ-δ semi-synchronous coordinate system and by using the Fourier coefficient equivalent value or a value multiple times larger than the Fourier coefficient equivalent value.

3. The rotor phase/speed estimating device of claim 1, wherein the high-frequency voltage injected by the high-frequency voltage injection unit is a sinusoidal voltage expressed by a trigonometric function in which a time integration value of the high frequency $\omega_h$ is used as a variable.

4. The rotor phase/speed estimating device of claim 2, wherein the high-frequency voltage injected by the high-frequency voltage injection unit is a sinusoidal voltage expressed by a trigonometric function in which a time integration value of the high frequency $\omega_h$ is used as a variable.

5. The rotor phase/speed estimating device of claim 1, wherein the Fourier coefficient equivalent value has a positive polarity or a negative polarity.

6. The rotor phase/speed estimating device of claim 2, wherein the Fourier coefficient equivalent value has a positive polarity or a negative polarity.

* * * * *